J. J. KENNEDY.
TOY.
APPLICATION FILED MAR. 21, 1916.
1,211,590.
Patented Jan. 9, 1917.
2 SHEETS—SHEET 2.
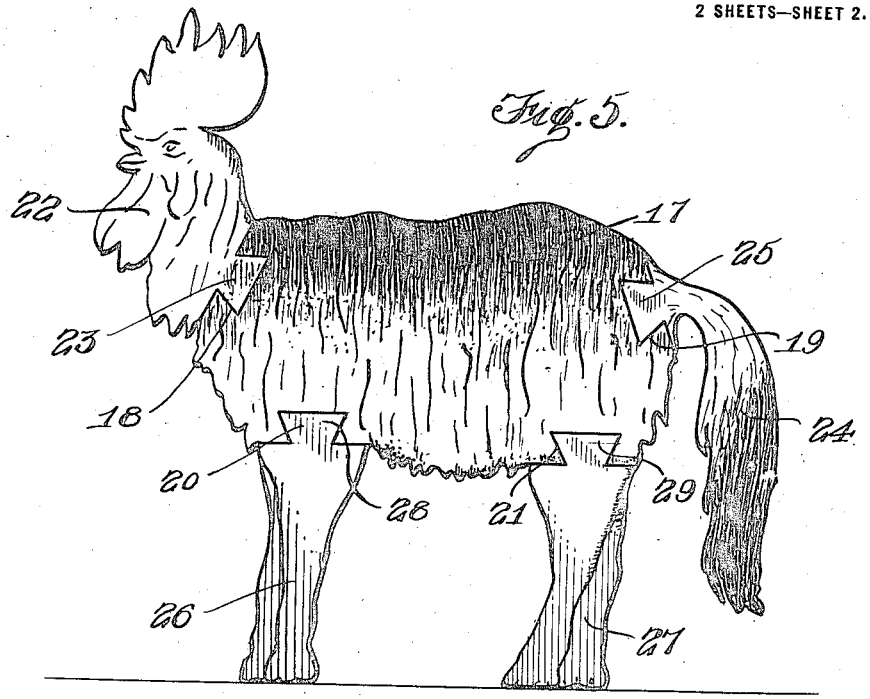

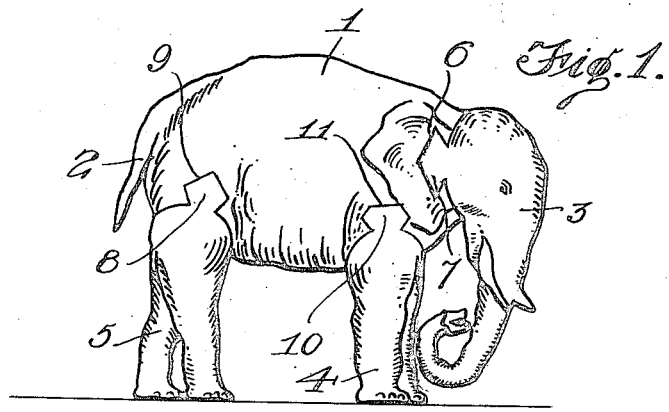
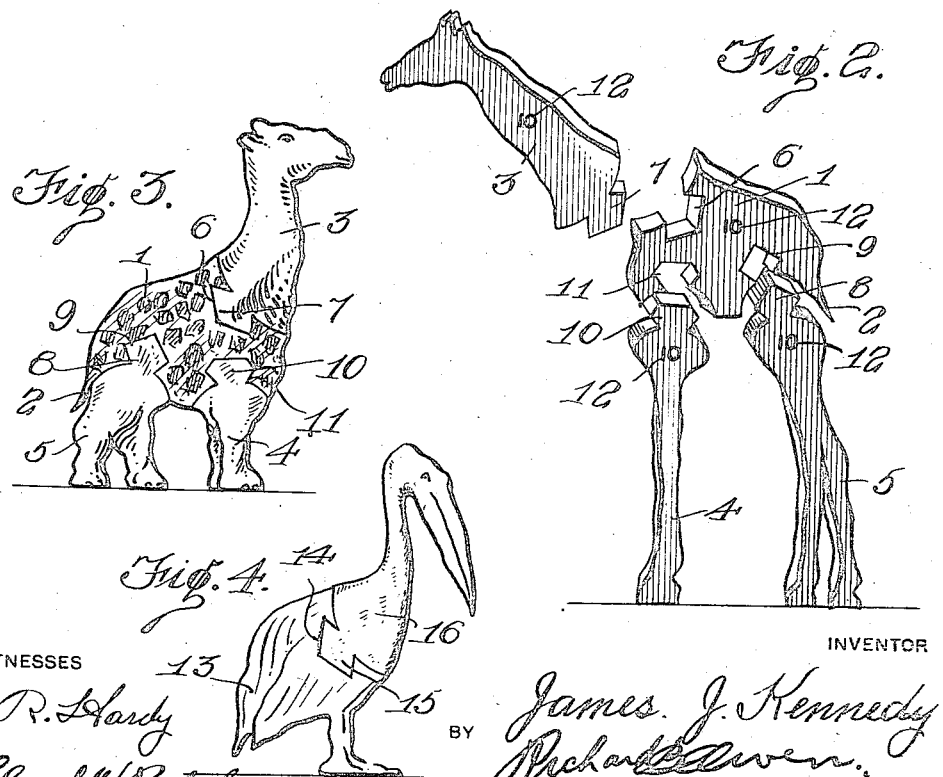

UNITED STATES PATENT OFFICE.

JAMES J. KENNEDY, OF BROOKLYN, NEW YORK.

TOY.

1,211,590.  Specification of Letters Patent.  Patented Jan. 9, 1917.

Application filed March 21, 1916.  Serial No. 85,657.

*To all whom it may concern:*

Be it known that I, JAMES J. KENNEDY, a citizen of the United States, residing at Brooklyn, in the county of Kings and State of New York, have invented certain new and useful Improvements in Toys, of which the following is a specification.

An object of my invention is to provide a toy in which pictorial representations of animals, birds, people, etc., are dismembered to have the heads and legs separate from the body portions, and in which the parts are provided with portions of interfitting joints to permit the head and leg members to be joined with the bodies in natural form or in freakish form, thus making it possible to provide a plurality of bodies and a plurality of dismembered parts which can be fitted together in a considerable number of varied forms.

A further object is to so construct the interfitting joints that the various dismembered parts may be really interchanged in the various animal or other forms, and when mounted in the interfitted relation will build up and correspond with the remaining dismembered parts or bits to lie in the same plane therewith and to be held against accidental displacement through force exerted in a line coextending with the planes in which the various members lie.

A still further object lies in so designating the various parts that the relative fitting of the same to their proper relations may be very readily determined.

With the above and other objects in view, my invention consists in certain novel features of construction and combinations of parts which will be hereinafter set forth in connection with the drawings and then more particularly pointed out in the claims.

In the drawings, Figure 1 is a view in side elevation showing an animal form built up by the use of a plurality of the dismembered parts. Fig. 2 is a view from the back side illustrating the dismembered parts in perspective with the interfitting joints disconnected and showing the manner of designating the parts for any particular animal or form. Fig. 3 is a view similar to Fig. 1 showing the parts of three various animal forms freakishly connected together. Fig. 4 is a view showing the bird form and illustrating one manner of dismembering the same. Fig. 5 is a view showing an animal freakishly constructed through the use of unrelated dismembered parts and illustrating a varied form of connecting joints. Fig. 6 is a view showing the arrangement employed in dismembering the pictorial representations of people. Fig. 7 is a view similar to Fig. 6, showing yet another distortion accomplished through the interfitting of unrelated parts. Fig. 8 is a view in perspective to better illustrate the form of one of the dismembered parts used in the form disclosed in Fig. 5. Fig. 9 is a fragmentary view to illustrate a modified form of joint which might be used in the form of the device as illustrated in Fig. 5. Fig. 10 is a detail view illustrating another modified form of joint, and with the parts thereof disassembled. Fig. 11 is a fragmentary view to show yet another modification which might be resorted to in the connecting joints for the dismembered parts.

The various parts might be constructed by being stamped from cardboard having the desired pictorial representations printed thereon, or might be constructed by being sawed or otherwise shaped or cut from wooden blocks having the pictorial representations printed directly thereon or printed on paper or on other material secured on the blocks. Further, while it is my intention that in the main, this shall be considered as a completed toy, it will be understood that various dismembered parts might be printed or otherwise illustrated on sheets of papers to be placed on cardboard and subsequently cut out, or might be printed directly upon the cardboard to be cut out by the user just prior to the use of the toy. As is stated, the parts of the toy might be of various materials, and further the device might partake of various forms of completion, although it is perhaps preferable that the dismembered parts be constructed of wood of sufficient thickness that warping or breaking off of the parts will not readily occur, or in some adaptations, the wooden blocks from which the parts are cut out or shaped may be laminated to have the laminæ disposed with crossing grains to give the desired strength especially at the joints.

As is shown in Figs. 1, 2, and 3, the construction of the parts and the shaping of the connecting joints is made substantially identical, thus making these various pictorial representations of such form that the dismembered parts can be interchangeably fitted in various animal forms to permit the construction of animal forms of natural or freakish character.

In Fig. 1, a pictorial representation of an elephant is shown and as here illustrated, the body 1 has the tail 2 formed integral therewith, and the head 3, fore legs 4, and hind legs 5 are made as dismembered parts separate from the body. In the neck portion of the body member 1, a substantially diamond-shaped socket or mortise 6 is provided and the head member 3 has a tenon or tongue 7 of substantially the same configuration as the socket or mortise 6 formed to extend therefrom in such relation that as this tenon 7 is fitted within the mortise 6, the head will be properly positioned with respect to the body. The dismembered part carrying the pictorial representation of the hind legs of the animal has a tenon 8 which is substantially square in its outline formed to extend therefrom, and the body member 1 is provided with a socket or mortise 9 of corresponding shape to receive the tenon 8. The member 4 carrying the pictorial representation of the fore legs of the animal has a peculiarly shaped tenon 10 formed thereon, this tenon partaking of a keystone or dovetail shape, and a socket or mortise of substantially the same form is provided at the proper point in the body member 1 to receive this tenon 10. From the foregoing it will be seen that the tenons 7, 8, and 10 are each of a varied shape and the sockets 6, 9 and 11 are consequently necessarily of varied shapes also, and thus when an attempt is made to fit the member 5 where the member 4 rightfully belongs, such attempt is frustrated by the fact that the tenons of these members will not fit the sockets or mortises, and to provide an additional hindrance against the improper fitting of the various dismembered parts, the spaces of the dismembered parts where they are to be connected with the body portion might be varied in their configuration. As is here illustrated, the leg member 4 has the space or edge which is connected to the body made arcuated with the arc formed on a comparatively small radius whereas the head member 3 has the connecting edge formed on an arc shaped with a radius of a considerably increased size, and the leg member 5 has the connecting end thereof formed with a somewhat composite arcuated shape.

In Fig. 2, the dismembered parts of a representation of a giraffe are shown, and these parts have the same form of interfitting joints, these parts being consequently given the same reference characters as are contained in the description of the parts in Fig. 1. As is shown in Fig. 2, the various dismembered parts are not only identified so that the proper positioning of the same with respect to the body may be determined, but also the body member, head member, and leg members of each pictorial representation are marked with identifying markings as shown at 12, so that all of the parts of any particular representation may be readily picked or assorted out of a plurality of disconnected bodies, heads, and leg members which have been jumbled together.

In the disclosure in Fig. 3, the parts have been jumbled so that in this representation, the body of a giraffe has the head of a camel and the legs of a rhinoceros connected therewith, and as will be noted by a comparison of the representations in Figs. 1 and 2, with the disclosure in this figure, it is not considered essential that the leg members of the various forms be made of the same length, that is to say, it is not necessary that the legs of the giraffe be contracted to have the same of a length equal to the legs of the rhinoceros, or that the legs of the rhinoceros be extended to accomplish this purpose, although it will of course be apparent that with some various forms it can be accomplished so that a composite animal form might be built up with the fore legs of a horse and the hind legs of an elephant, or other various changes and freakish arrangements might be resorted to.

Where bird forms such as shown in Fig. 4 are used, it will be probably advisable that the dismemberment be accomplished so that the body will constitute one unit which will embrace the legs and that the head shall constitute the second unit, and as is here shown, the body member 13 has a socket or mortise 14 provided therein and a tenon 15 is provided on the head member 16 of a shape to fit within the socket or mortise 14. Where the bird forms are to be used with animals, it is perhaps desirable that the socket 14 and the tenon 15 be made of the same shape as the sockets or mortises 6 and the tenons 7 of the animal forms, and thus the parts may be fitted in the interchanged relation and a greater variety of freakish forms can be accomplished.

As is shown in Fig. 5, the tail of the animal is shown as being dismembered and the mortises and tenons of the various connections are so shaped that the heads, tails, and leg members may be interchangeably fitted at the various points of location around the body member. The body 17, which is here illustrated as being that of a goat, has a dovetail socket or mortise 18 formed to extend transversely through the stock from which the body is cut, substantially at the neck, a similar socket 19 is provided at the positioning of the tail and the sockets or mortises 20 and 21 of like configuration are positioned at the proper points where the front and hind legs are to be fitted. As has been stated, these sockets 18, 19, 20, and 21 are all preferably of the same configuration, and it is also preferable that the sockets be made of the same size so that the various parts will be freely interchangeable in both the proper relations and in what might perhaps be called improper fittings or arrangements.

The head 22 which is shown as that of a rooster, has the dovetail-shaped tenon 23 formed to be received in the socket 18, and to hold the head at the proper elevation. The tail 24, which is here illustrated as a horse's tail, has the dovetail-shaped tenon 25 to be received in the socket 19. The front legs 26 and the hind legs 27 have the dovetail-shaped tenons 28 and 29 provided on the upper ends thereof to permit the same to be fitted to be held within the sockets 20 and 21. In Fig. 8, I have shown in perspective a slightly varied form of leg member in which the two legs are separated to give the appearance of action, and as is here illustrated, it might be found advisable to cut out the material between the legs, although it will of course be understood that the construction and form of the various dismembered parts or bits might partake of a great number of changes.

In the adaptation of the invention illustrated in Figs. 6 and 7, the body 30 is better adapted to fit with the head member 31 and the leg member 32, whereas the body member 33 corresponds perhaps better with the head 34 and the leg member 35, however, these parts have been jumbled to better illustrate the use to which the dismembered parts may be put in procuring the freakish representation. As is shown in this adaptation and as has been stated above, the head members, body members, and leg members, as well as the tails, when the animal forms are used can be made of various lengths and varied proportions.

With the modification shown in Fig. 9, the tenon 36 is of substantially diamond shape, being merged with the member 37 at one of its points and consequently the mortise or socket 38 in the body member partakes of the same form. In Figs. 5 to 8 inclusive, the joints are illustrated as being substantially a square line where the various members fit against the body, however, this line might be curved as shown at 39 or as described above, or it might be further distorted as is shown in Fig. 11. In the form of connecting joints as shown in Fig. 10, two tenons 40 and 41 which are substantially a three-quarters circular shape are connected in a spaced-apart relation on the upper end of the member 42 and the body portion has the correspondingly shaped sockets 43 and 44 provided in a correspondingly spaced relation to receive these tenons. With the disclosure in Fig. 11, the upper end of the leg member 45 partakes somewhat of a trefoil shape, the side lobes 46 and 47 being of the usual form, and the top lobe 48 being dovetail-shaped, and it will of course be understood that the socket of the body is made of a shape corresponding to this shaped upper end of the leg 45 so that as the leg member is fitted in place, it is made secure by what amounts to substantially a double locking joint.

From the foregoing, it will be seen that I have provided a toy in which a plurality of bodies and depending members may be formed separately with the dismembered parts having one portion of an interfitting joint and the body provided with the remaining portion of the joint at proper points to permit the dismembered portions to be fitted thereto, and as the depending members are each connected with the body members by joints which are in their essential holding action substantially dovetail or keystone shape, these members will be held against displacement through force exerted in a line extensive with the plane in which the assembled members lie and thus if the joints between the parts are made sufficiently tight that the tenons or tongues will have frictional bearing with the side walls of the sockets or mortises, the assembled toy may be readily handled and carried by the depending members without displacing any of the parts from their fitted relation.

While I have herein shown and described the device in each adaptation as having the sockets or mortises provided in the body portion and the tenons or tongues provided on the dismembered parts, it will be understood that this order in the arrangement might be reversed so that the body will carry the tenons and the mortises will be in the dismembered parts, and also while I have herein shown and described only specific forms of joints, it will be apparent that other modifications might be resorted to in these parts as well as in the remaining parts of the structure, and that the animal, fowl, person, and other forms being represented can be indefinitely varied without departing from the spirit and scope of my invention, and hence I do not wish to be limited to the exact disclosure, but only to such points as may be set forth in the claims.

I claim:—

1. A toy comprising a body shaped to have dismembered parts connected therewith at predetermined points, and a plurality of dismembered parts, said body and said dismembered parts being provided with corresponding portions of interfitting joints by which the members are fitted and connected to the body to be held against displacement through endwise strain.

2. A toy comprising a dismembered body of animal or other shape having mortised sockets notched out of the material thereof substantially at the points of dismemberment and extending across the thickness of the material comprising the body, a plurality of members corresponding to the dismembered parts, and tenons carried by said parts of configuration corresponding to the shape of the mortised sockets arranged to be received in the sockets to hold the members fitted in the proper relation as the tenons are inserted laterally.

3. A toy comprising a plurality of body members of animal or like form, a plurality of head and leg members, dovetailed mortise sockets provided in certain of said members, and tenons carried by the remaining members to be fitted in the dovetailed sockets to hold the members secured in proper relation.

4. A toy comprising a plurality of body members of animal and like form, a plurality of head and leg members, said body members provided with substantially dovetailed shaped mortise sockets notched from the material thereof to extend transversely and through the thickness of the same, and substantially dovetailed shaped tenons carried by the dismembered parts to be fitted in the dovetailed shaped sockets through lateral movement and to hold the dismembered parts secured to the body in the proper relation and against withdrawal through strain exerted in a line with the plane in which the bodies and dismembered parts are disposed.

5. A toy comprising a plurality of body members of a substantial thickness in their transverse extent, a plurality of head and like extending members for said bodies made of substantially the same thickness, substantially dovetail-shaped mortise sockets formed in said bodies at points corresponding to the natural placing of the extending members, substantially dovetail-shaped tenons formed on said members, and all of said parts so arranged that the extending members may be fitted to the body members to be held against displacement through pulling strain exerted in line with the plane in which the several members are disposed and to present a sufficient thickness in the legs of the toy to permit the same to stand upright.

6. A toy comprising a dismembered body of animal or other shape, a plurality of members corresponding to the dismembered parts, tenons of various configurations carried by said dismembered parts, and mortise sockets formed in the body at the points of dismemberment to receive the tenons when the members are properly fitted and to hold the members against displacement.

7. A toy comprising a plurality of body members of substantially equal thickness in their transverse extent and said body members partaking of shapes corresponding to dismembered animal and like body forms, said body forms provided with variously shaped mortise sockets notched out of the material thereof at the points of dismemberment in a relation that the sockets extend through the thickness of the body material, a plurality of members corresponding to the dismembered parts of the body forms, and tenons provided on the various dismembered parts shaped to correspond with the mortise sockets as formed at the points of dismemberment as the dismembered parts are fitted to have the tenons received laterally in the sockets.

8. A toy comprising a dismembered body of animal or other shape, a plurality of members corresponding to the dismembered parts, mortise sockets of various configurations formed transversely through the body portion substantially at the points of dismemberment, and tenons of corresponding configurations formed in conjunction with said dismembered parts to be received laterally in the mortise sockets of the body portion to thus hold the dismembered parts in proper relation.

9. A toy comprising a plurality of dismembered body members of animal or other shapes, a plurality of members corresponding to the dismembered parts, tenons of various configurations carried by certain of said members, and mortise sockets formed in other of the members at the points of dismemberment of those members having tenons thereon and shaped to partake of the same configuration to thus allow fitting of the dismembered parts in proper relation.

10. A toy comprising a plurality of dismembered bodies of animal or like shape, sockets formed in each of said bodies to partake of various configurations and so shaped that those sockets formed at corresponding points in each of the bodies correspond in their configuration, a plurality of members corresponding to the dismembered parts, and variously shaped tenons carried by said dismembered parts, the tenons of all like dismembered parts being provided with like tenons to thus permit fitting of the dismembered parts in conjunction with the bodies and to insure that the dismembered parts will be fitted at the proper points upon the body.

11. A toy comprising a plurality of dismembered body members of animal or other shape, a plurality of head and like members formed to partake of the shape of the dismembered parts of the body members, sockets formed in each of said body members of identical form at the point corresponding to the dismemberment of the head thereof, sockets of variously shaped configurations formed in the body portions for the forward and rear legs of the animal or other shape, and tenons carried by said dismembered parts corresponding in shape to the shaping of the sockets and thus insuring that the heads and leg portions will be interchangeable but at the same time always fitted in proper relation.

In testimony whereof I affix my signature in presence of two witnesses.

JAMES J. KENNEDY.

Witnesses:
 WILLIAM ALLAN,
 A. LESLIE ALLAN.